Nov. 1, 1932.                H. C. HOLLAND                 1,885,442
                COMBINED BRAKE AND CLUTCH PEDAL STRUCTURE
                          Filed Aug. 19, 1931
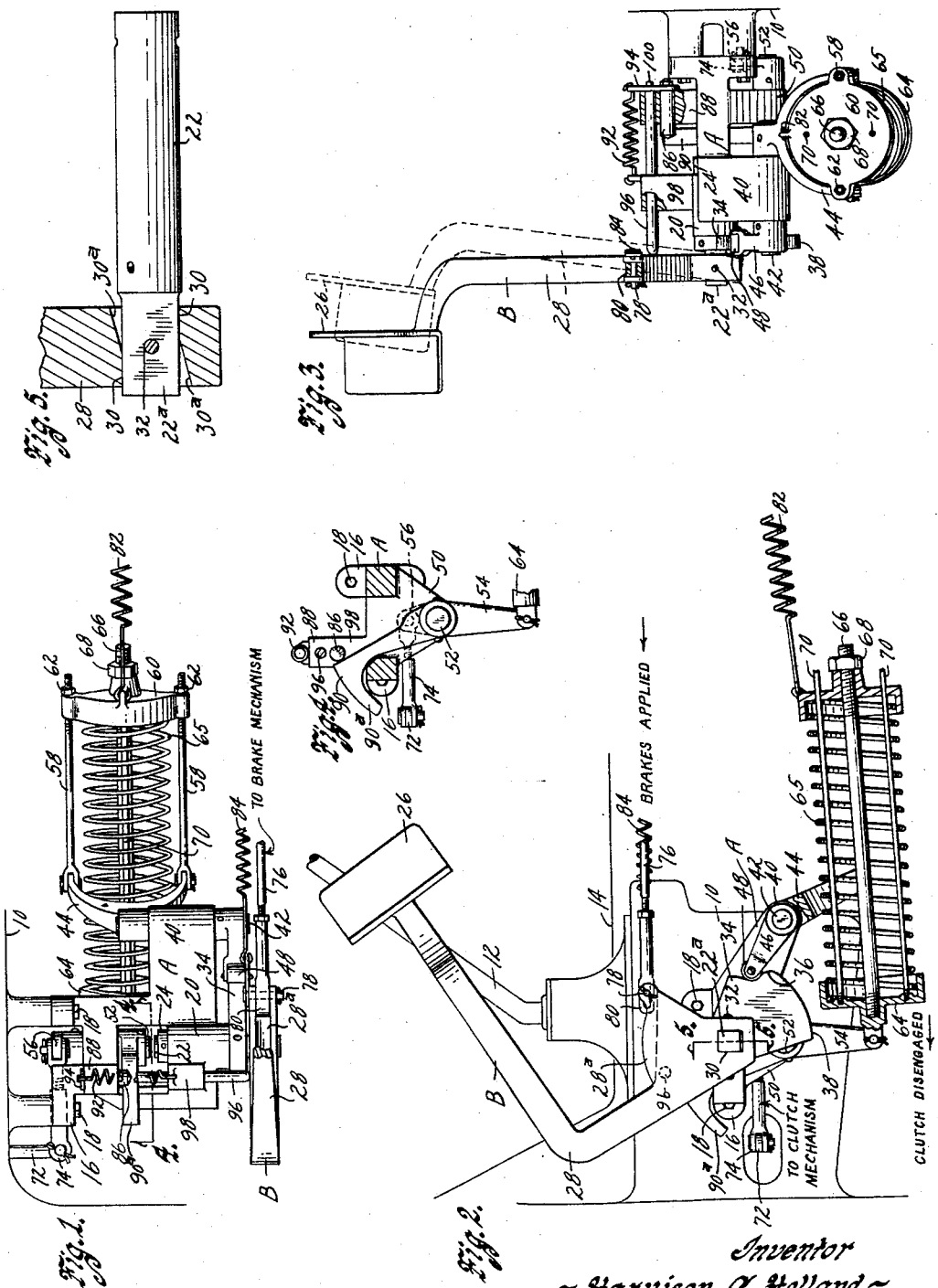
Inventor
~ Harvison C. Holland ~
By Bair, Freeman & Sinclair
                Attorneys
Witness
H. S. Munzenmaier Patented Nov. 1, 1932

1,885,442

UNITED STATES PATENT OFFICE

HARVISON C. HOLLAND, OF DES MOINES, IOWA

COMBINED BRAKE AND CLUTCH PEDAL STRUCTURE

Application filed August 19, 1931. Serial No. 558,009.

An object of my invention is to provide a pedal structure which can be used for controlling both the brake and the clutch of an automobile or the like, the structure being of simple, durable and comparatively inexpensive construction.

A further object is to provide a depressible pedal for use with brake and clutch mechanisms, which may normally be operated for applying the brakes only, but may upon sidewise adjustment become operative to disengage the clutch before applying the brakes. Thus a single pedal can be conveniently used for both brake and clutch control.

A further object is to provide such a structure in which, if desired, after the brakes only are applied, the pedal can be shifted sidewise for then disengaging the clutch.

More particularly it is my object to provide a pedal connected with brake mechanism by lost motion connection, a spring interposed between the pedal and clutch mechanism and a normally effective lock for the clutch mechanism, the pedal normally assuming a predetermined position but being sidewise shiftable to assume a clutch operating position in which position it renders said clutch lock ineffective.

Still a further object is to provide a pedal connected with brake mechanism and through a spring connection with clutch mechanism the clutch mechanism having a lock for normally preventing its movement, and such lock being rendered ineffective by sidewise shifting of the pedal.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:—

Figure 1 is a plan view of my combined brake and clutch pedal structure, showing it connected with the side of a clutch and transmission casing of an automobile.

Figure 2 is a side elevation of the same.

Figure 3 is a rear elevation of the combined brake and clutch pedal structure.

Figure 4 is a sectional view on the line 4—4 of Figure 1 to illustrate the clutch lock; and Figure 5 is an enlarged sectional view on the line 5—5 of Figure 2, illustrating a pedal shaft and a portion of the pedal.

On the accompanying drawing I have used the reference numeral 10 to indicate a transmission and clutch housing of an automobile. The gear shift lever is indicated at 12 and floor boards are indicated at 14.

Although I have shown my combined brake and clutch pedal structure applied to an automobile it of course can be applied to any device having brake and clutch mechanisms, or other mechanisms to which similar movement is desired to be imparted.

My invention includes a stationary frame member A having attaching feet 16, which may be secured to the side of the housing 10 by cap screws 18 or the like. The frame A has a bearing 20 in which a pedal shaft 22 is journaled. A collar 24 is secured to the inner end of the shaft 22 and the outer end of the shaft, as indicated at 22a, is squared (see Figure 5).

A pedal B is mounted on the pedal shaft 22 in the following described manner. The pedal B comprises a foot engaging portion 26 and an arm portion 28. The arm portion 28 is provided with a rectangular opening 30 to fit the squared portion 22a of the pedal shaft 22.

Two diagonally opposite sides of the opening 30 are beveled as indicated at 30a in Figure 5. The pedal arm 28 is secured to the shaft 22 and arranged for slight pivotal movement relative thereto by means of a pin 32. The purpose of this arrangement will be hereinafter fully explained.

Secured to the pedal shaft 22 is a cam 34 having a rise 36 and a dwell 38. The frame A has an arm-like bearing 40 in which a yoke shaft 42 is journaled. A yoke 44 is secured to one end of the shaft 42 and a roller arm 46 is secured to the other end thereof. A roller 48 is journaled in the outer forked end of the roller arm 46 and engages the cam 34.

In another arm-like bearing 50 of the frame A I journal a clutch shaft 52. Clutch arms 54 and 56 are secured to the clutch shaft 52 on opposite sides of the bearing 50.

An operative connection is provided between the clutch arm 54 and the yoke 44 including links 58 connected with the yoke and with a spring head 60. Adjusting nuts 62 are provided on the rod like links 58. A spring head 64 is connected with the clutch arm 54. A spring 65 is interposed between the spring heads 60 and 64.

An alignment rod 66 extends from the spring head 64 and slidably through the spring head 60. An adjusting and stop nut 68 is provided on the alignment rod 66. Additional alignment rods 70 are provided connected with one of the spring heads and slidable through the other one.

The clutch lever of the automobile is indicated at 72. The clutch lever 72 is connected with the clutch arm 56 by an adjustable link connection 74.

A brake rod 76 extending to the service brakes of the automobile is operatively connected with the pedal arm 28 by a lost motion connection including a pin 78 and a slot 80. A clutch spring 82 serves to maintain the roller 48 in engagement with the cam 34 and the clutch lever 72 in its normally engaged position in addition to the usual spring provided within the clutch structure itself. A brake spring 84 serves to maintain the brake rod 76 in a predetermined position before the lost motion connection 78 and 80 is taken up during operation of the pedal B. The springs 82 and 84 have their ends which are broken off on the drawing connected with stationary parts of the frame of the automobile.

I provide locking means for the clutch lever 72 consisting of a locking pin 86 slidably mounted in an arm 88 of the frame A. The pin 86 engages behind a lock arm 90 secured to the clutch shaft 52, or preferably forming an extension of the clutch arm 54.

The lock pin 86 is normally retained in locked position shown in Figures 3 and 4 by a spring 92, which is connected with a link 94, which in turn is connected with the pin 86. An unlocking pin 96 is slidably mounted in the arm 88 and in an arm 98 of the frame A. It has a shouldered end 100 engaging against the link 94.

*Practical operation*

In the operation of my combined brake and clutch pedal structure the pedal B may normally be depressed for applying the brakes only. This is accomplished through depression of the pedal B, and consequent tightening of the lost motion connection 78 and 80 and the movement of the brake rod 76 in a brake applying direction.

Such depression of the pedal B rotates the pedal shaft 22 and oscillates the cam 34. Oscillation of the cam causes the rise 36 thereof to swing the roller 48 and the yoke 44 in a clockwise direction (see Figure 2). Since the lock pin 86 prevents swinging of the clutch arm 54, the spring 65 will be compressed without imparting clutch disengagement movement to the clutch lever 72.

When it is desired, however, to disengage the clutch mechanism as well as apply the brakes, the foot engaging member 26 may be swung sidewise by the operator to the dotted line position shown in Figure 3, which moves the unlocking pin 96 in a right hand direction and withdraws the locking pin 86 from behind the lock arm 90.

Depression of the pedal B will now first cause disengagement of the clutch mechanism because of clockwise swinging of the yoke 44 which moves the clutch shaft 52 in a clockwise direction, the spring 65 serving as an operative connection between the yoke 44 and the clutch arm 54. The spring 65 of course is strong enough to overcome the clutch spring of the clutch mechanism itself.

In the event that the brakes only have been applied and it is then desirable to disengage the clutch, the pedal B may be swung sidewise whereupon the locking pin 86 will be withdrawn and the spring 65 which is under tension will thereupon expand and disengage the clutch.

As shown in Figure 5 the shape of the opening 30 acts as a stop to normally limit the pedal B to upright position as shown in full lines, but allows the pedal to be swung toward the right as shown by dotted lines in Figure 3. The spring 92 through the link 94 and the shouldered pin 96 serves to normally maintain the pedal B in the full line position.

It will be noted that the pedal arm 28 has a sector portion 28a to always limit the movement of the pin 96 in a left hand direction regardless of the position of the pedal B. Likewise, the lock arm 90 has a sector portion 90a for the lock pin 86 to engage against when the clutch is in disengaged position and in which position the pedal B can be allowed to swing back to its normal position.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. For use with brake and clutch mechanisms, a combined brake and clutch pedal structure comprising a pedal connected with said brake mechanism by a lost motion connection, a spring interposed between said pedal and said clutch mechanism and a normally effective lock for said clutch mechanism, spring means constraining said pedal to normally assume a predetermined position from which it is movable to assume a clutch operating position, said pedal being operatively connected with said clutch lock to render the same ineffective when said pedal is moved to clutch operating position.

2. For use with brake and clutch mechanisms, a combined brake and clutch pedal structure comprising a pedal connected with said brake mechanism, a spring interposed between said pedal and said clutch mechanism and a normally effective lock for said clutch mechanism, spring means constraining said pedal to normally assume a predetermined position from which it is movable to assume a clutch operating position, said pedal being operatively connected with said clutch lock to render the same ineffective when said pedal is moved to clutch operating position.

3. For use with brake and clutch mechanisms, a combined brake and clutch pedal structure comprising a pedal connected with said brake mechanism, a spring interposed between said pedal and said clutch mechanism, and a normally effective lock for said clutch mechanism, said pedal being manipulatable to a position for rendering said lock ineffective whereby said pedal may also disengage said clutch mechanism.

4. For use with brake and clutch mechanisms, a combined brake and clutch pedal structure comprising a pedal connected with said brake mechanism, a spring interposed between said pedal and said clutch mechanism, and a normally effective lock for said clutch mechanism, said pedal being manipulatable to a position for rendering said lock ineffective whereby said pedal may also disengage said clutch mechanism through the medium of said spring.

5. For use with brake and clutch mechanisms, a combined brake and clutch pedal structure comprising a depressible and sidewise movable pedal, said pedal being operatively connected with said brake mechanism to render it operative whenever the pedal is depressed and being also connected with said clutch mechanism, said last connection including resilient means normally compressible only but effective to render said clutch mechanism disengaged when said pedal is moved sidewise.

6. For use with brake and clutch mechanisms, a combined brake and clutch pedal structure comprising a depressible and sidewise movable pedal, said pedal being operatively connected with said brake mechanism to render it operative whenever the pedal is depressed and being also connected with said clutch mechanism, said last connection including resilient means, and means for preventing operation of said clutch mechanism except when said pedal is moved sidewise.

7. For use with brake and clutch mechanisms, a combined brake and clutch pedal structure comprising a depressible and sidewise movable pedal, said pedal being operatively connected with said brake mechanism to render it operative whenever the pedal is depressed and also being connected with said clutch mechanism, said last connection including resilient means, and means for preventing operation of said clutch mechanism, said pedal being connected with said last means to render it effective to disengage the clutch mechanism upon sidewise movement being imparted to said pedal.

8. For use with brake and clutch mechanisms, a combined brake and clutch pedal structure comprising a depressible and sidewise movable pedal, said pedal being operatively connected with said brake mechanism to render it operative whenever the pedal is depressed only and being also connected with said clutch mechanism to first disengage it whenever the pedal is depressed and moved sidewise and then retain it disengaged throughout further depression of the pedal to apply the brake.

9. For use with brake and clutch mechanisms, a combined brake and clutch pedal structure comprising a depressible and sidewise movable pedal, said pedal being operatively connected with said brake mechanism to render it operative whenever the pedal is depressed, a resilient connection between said pedal and said clutch mechanism, means for normally locking said clutch mechanism against disengagement, whereby depression of said pedal will compress said resilient connection, said pedal being operatively connected with said locking means to unlock the same upon sidewise movement being imparted to said pedal and to thereby allow said resilient connection to expand and disengage said clutch mechanism.

10. For use with brake and clutch mechanisms, a combined brake and clutch pedal structure comprising a depressible and sidewise movable pedal, said pedal being operatively connected with said brake mechanism to render it operative whenever the pedal is depressed, a resilient connection between said pedal and said clutch mechanism, means for normally locking said clutch mechanism against disengagement, whereby sidewise motion of said pedal followed by depression thereof will first disengage said clutch, then apply said brake, said clutch being held in disengaged position while said brake is being applied, said lock being made ineffective by sidewise motion of said pedal.

11. For use with brake and clutch mechanisms, a combined brake and clutch pedal structure comprising a depressible and sidewise movable pedal, a resilient connection between said pedal and said clutch mechanism, means for normally locking said clutch mechanism against disengagement, whereby depression of said pedal will compress said resilient connection and a lost motion connection for operatively connecting said pedal with said brake mechanism whereby to apply the brake mechanism after such compression of said resilient connection.

HARVISON C. HOLLAND.